US008990398B1

(12) United States Patent
Thrane

(10) Patent No.: US 8,990,398 B1
(45) Date of Patent: Mar. 24, 2015

(54) SYSTEMS AND METHODS FOR PROCESSING REQUESTS FOR NETWORK RESOURCES

(75) Inventor: Leon Thrane, Issaquah, WA (US)

(73) Assignee: Amazon Technologies, Inc., Reno, NV (US)

(*) Notice: Subject to any disclaimer, the term of this patent is extended or adjusted under 35 U.S.C. 154(b) by 120 days.

(21) Appl. No.: 13/443,128

(22) Filed: Apr. 10, 2012

(51) Int. Cl.
*G06F 15/173* (2006.01)
(52) U.S. Cl.
USPC .......................................... 709/226
(58) Field of Classification Search
USPC ................................. 709/226, 224
See application file for complete search history.

(56) References Cited

U.S. PATENT DOCUMENTS

| 7,386,628 | B1 * | 6/2008 | Hansell et al. | 709/238 |
| 7,814,204 | B1 * | 10/2010 | Wang et al. | 709/226 |
| 2003/0115202 | A1 * | 6/2003 | Jackson et al. | 707/10 |
| 2007/0121626 | A1 * | 5/2007 | Shepard | 370/389 |
| 2008/0002736 | A1 * | 1/2008 | Droux et al. | 370/463 |

* cited by examiner

*Primary Examiner* — Vivek Srivastava
*Assistant Examiner* — Hermon Asres
(74) *Attorney, Agent, or Firm* — Sutherland Asbill & Brennan LLP

(57) ABSTRACT

Systems and methods for processing requests associated with network resources and/or virtualization services are provided. A request associated with one or more network resources may be received, and a set of one or more tags associated with the request may be identified. A representative value for the set of one or more tags may then be determined utilizing, for example, a hashing operation or a compression function. The representative value may be associated with a request prior to the request being processed by at least one network server. Subsequently, the set of one or more tags may be reconstructed based at least in part upon the representative value in order to facilitate the generation of one or more reports, such as billing reports or resource usage reports.

25 Claims, 7 Drawing Sheets

SYSTEMS AND METHODS FOR PROCESSING REQUESTS FOR NETWORK RESOURCES

BACKGROUND

A wide variety of companies and organizations operate and/or utilize computer networks that interconnect numerous computing systems. The computing systems can be located in a single geographical location (e.g., as part of a local network) or located in multiple distinct geographical locations (e.g., connected via one or more private or public intermediate networks). Additionally, data centers, such as private and public data centers, can house any number of interconnected computing systems that provide network access, power, and hardware resources (e.g., computing and storage). To facilitate increased utilization of data center resources, virtualization technologies can allow individual physical computing machines to host one or more instances of virtual machines that appear and operate as independent machines on behalf of connected clients or users.

Clients or users often send requests to computing systems or virtual machines to allocate and/or utilize resources. For example, customers of a data center can send network resource allocation and/or resource use requests. For internal business reasons, a customer may wish to apply tags to various requests, thereby permitting the customer to monitor usage along any number of desired business dimensions. For example, as a customer increases the number of applications or services that utilize the data center, the customer may wish to utilize tags that allow requests to be attributed to relevant applications or services. However, the addition of tags to requests can lead to delays and additional overhead as the requests are processed by a data center. The overhead demands and delays may be increased as the size and number of tags increase.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1:
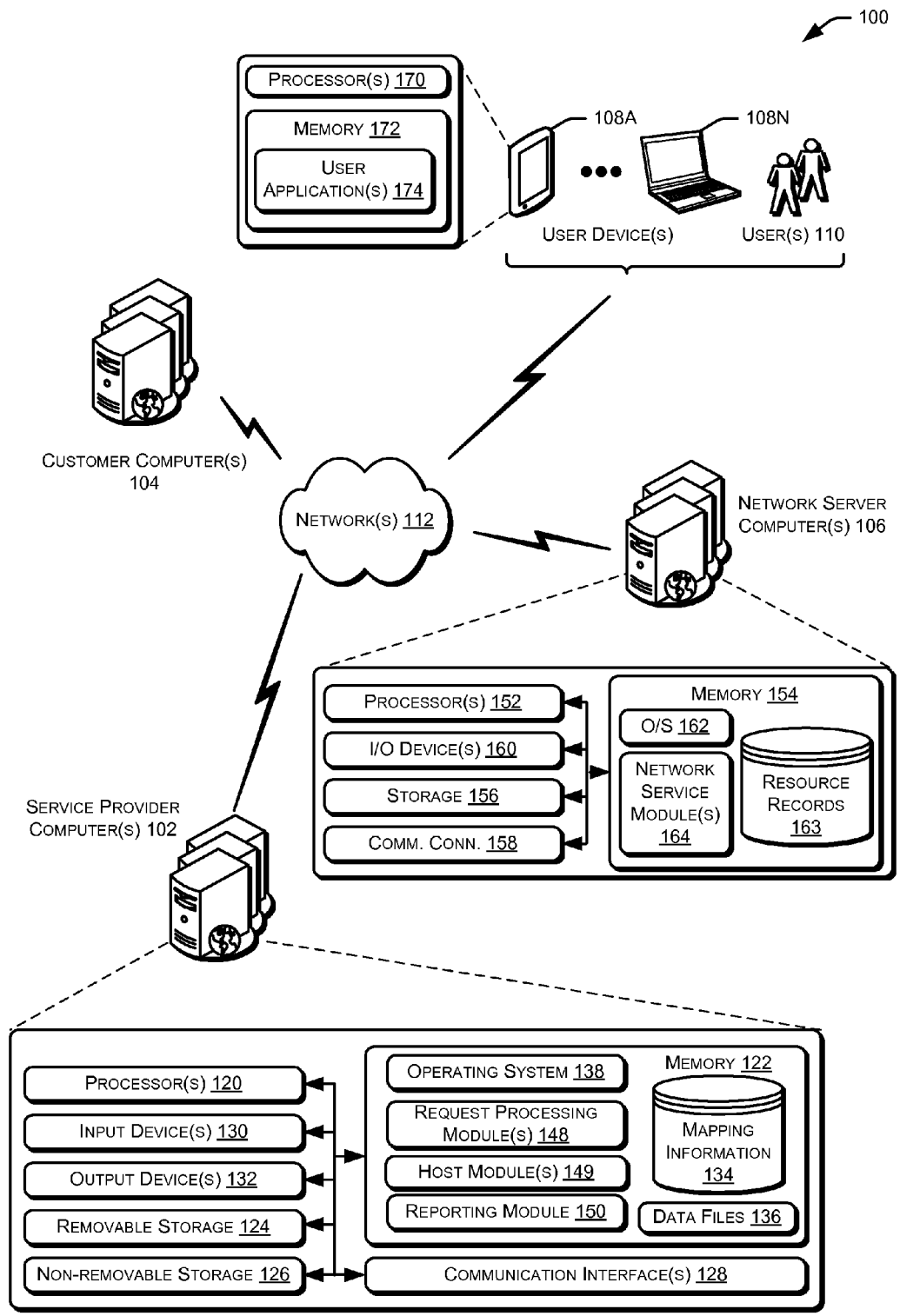
FIG. 1 illustrates a block diagram of an example system or architecture for providing network resources and processing requests associated with network resources.

Various embodiments of the present disclosure are directed to the processing of requests associated with network resources, such as requests to allocate resources, requests to utilize resources, requests to launch virtual machines, requests to terminate virtual machines, requests to access data objects, requests to store data objects, and/or requests to list data objects. In certain embodiments, a set of one or more tags may be associated with a request. The tags for a request may be customer or consumer-defined tags associated with any number of customer metrics for the request. For example, a customer may utilize tags to identify underlying products, applications, cost centers, and/or other metrics associated with requests. The tags may facilitate the generation of any number of reports, such as billing reports, on behalf of the customer. In this regard, a customer can track network resource usage along any number of desired business dimensions. For example, a customer that provides a multitude of social networking games may track resource allocation between the various games, between groups of players, and/or in accordance with any other desired metrics. Similarly, a customer that provides dedicated applications, such as tablet and/or mobile device applications, may track resource allocation associated with the applications.

According to an aspect of the disclosure, a representative value associated with a set of one or more tags may be determined and/or identified by a service provider, such as a service provider that receives and processes a request. For example, a representative value for a tag set may be determined by performing one or more hashing operations and/or one or more compression functions on the tag set. In certain embodiments, the service provider may determine or calculate the representative value, and the service provider may associate the representative value with the request. The service provider may additionally store mapping information associated with the representative value and the tag set. In other embodiments, a customer may determine a representative value, and the customer may associate the representative value with the request. As desired, the customer may provide or direct provision of mapping information to the service provider.

Once a representative value has been associated with a request, the request may be processed by any number of network servers and/or processes. For example, the request may be processed within a virtualization environment associated with any number of virtual machines. The representative value for the tag set may allow the request to be processed in a relatively expedited manner without contributing to increased overhead and/or latency delays. Additionally, during the subsequent generation of one or more reports (e.g., billing reports, etc.), the stored mapping information may be accessed and utilized to reconstruct the original tag set associated with the request. As desired, a customer or other user may specify any number of parameters and/or define tags to be evaluated during the generation of a report.

In certain embodiments, requests may be associated with and/or processed by a virtualization environment, such as a run-time environment that includes an application software stack for a customer's program together with one or more infrastructure services for executing the customer's program. As desired, the virtualization environment may be configured to be hosted at a specific uniform resource locator (URL) or Web address. Additionally, the virtualization environment may utilize a wide variety of suitable operating systems and/or provide a wide variety of different services, such as load balancing, load scaling, firewall, monitoring, and/or data storage services. In some embodiments, the customer may be able to select and/or launch one or more programs and/or services that can be included in the virtualization infrastructure, such as database models, operating systems, etc.

Certain embodiments will now be described more fully hereinafter with reference to the accompanying drawings, in which various embodiments and/or aspects are shown. However, various aspects may be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

System Overview

FIG. 1 illustrates a block diagram of an example system 100 or architecture for providing network resources and processing requests associated with network resources. As shown in FIG. 1, the system 100 may include any number of service provider computers 102, customer computers 104, network server computers 106, and/or user devices 108A-N associated with any number of users 110. In certain embodiments, the service provider computers 102 and network server computers 106 may be associated with a service provider, such as a provider of virtualization and/or network-based services. Additionally, any number of suitable networks 112, including both private and public networks, may facilitate communication between various components of the system 100. For example, certain networks (e.g., cellular networks, the Internet, etc.) may facilitate the communication of requests from customer computers 104 and/or user devices 108A-N to the service provider. Other networks may facilitate internal routing and/or communication of requests between various components of the service provider, such as the service provider computers 102 and/or the network server computers 106.

As explained in greater detail below, the customer computers 104 and/or the user devices 108A-N may communicate requests associated with network and/or virtualization environment-based resources to the service provider. The requests may be received and/or processed by the service provider computers 102 and/or the network server computers 106. For example, the service provider computers 102 may process the requests in order to identify, generate, and/or store tag set, representative value, and/or mapping information associated with the requests. The service provider computers 102 may then route or otherwise deliver the requests and associated representative values to appropriate network server computers 106, for example, via any number of suitable Web services and/or application programming interface (API) requests. In this regard, the network server computers 106 may process the requests to perform any number of suitable virtualization environment functions. Subsequently, mapping information may be utilized to reconstruct or determine tag sets associated with the requests for a wide variety of reporting and/or billing purposes.

Each of the components illustrated in FIG. 1 will now be described in greater detail. Generally, network devices and systems, including one or more of the service provider computers 102, customer computers 104, network server computers 106, and/or user devices 108A-N may include or otherwise be associated with suitable hardware and/or software for transmitting and receiving data and/or computer-executable instructions over one or more communications links or networks. These network devices and systems may also include any number of processors for processing data and executing computer-executable instructions, as well as other internal and peripheral components that are well-known in the art. Further, these network devices and systems may include or be in communication with any number of suitable memory devices operable to store data and/or computer-executable instructions. By executing computer-executable instructions, each of the network devices may form a special-purpose computer or particular machine. As used herein, the term "computer-readable medium" describes any form of suitable memory or memory device for retaining information in any form, including various kinds of storage devices (e.g., magnetic, optical, static, etc.).

With reference to FIG. 1, any number of service provider computers 102 may be utilized as desired in various embodiments. The service provider computers 102 may include any number of suitable processor-driven devices that facilitate, for example, the receipt of network resource requests, the identification of tag sets for network resource requests, the identification or determination of representative values for tag sets, the storage of mapping information associated with tag sets and representative values, and/or the reconstruction of tag sets for reporting purposes. In some example embodiments, the service provider computers 102 may include one or more server computers, mainframe computers, networked computers, desktop computers, personal computers, laptop computers, mobile computers, and/or other processor-based devices. The service provider computers 102 may utilize one or more processors 120 to execute computer-readable or computer-executable instructions to facilitate the operations of the service provider computers 102. As a result of executing these computer-executable instructions, a special-purpose computer or particular machine may be formed that facilitates the processing of requests as described herein.

An example service provider computer 102 will now be described. In addition to having one or more processors 120, the service provider computer 102 may further include one or more memory devices 122 (also referred to as memory 122), one or more communication interfaces 128, and/or one or more input devices 130 and output devices 132, as well as associated input/output (I/O) interfaces. The memory devices 122 may include any number of suitable memory devices, such as caches, read-only memory devices, random access memory devices, flash memory devices, magnetic storage devices, removable storage devices 124 (e.g., memory cards, etc.), and/or non-removable storage devices 126. As desired, the memory devices 122 may include internal memory devices and/or external memory devices in communication with the service provider computer 102. The memory devices 122 may store data, executable instructions, and/or various program modules utilized by the processors 120. Examples of data that may be stored by the memory devices 122 include data files 136 and/or any number of databases and/or other memory constructs, such as one or more mapping information databases 134, and/or any number of suitable program modules and/or applications that may be executed by the processors 120, such as an operating system (OS) 138, one or more request processing modules 148, one or more host modules 149, and/or a reporting module 150.

Stored data files 136 may include any suitable data that facilitates the operation of the service provider computer 102 and/or the interaction of the service provider computer 102 with one or more other components of the system 100. For example, the stored data files 136 may include, but are not limited to, information that facilitates communication with the customer computers 104 and/or the user devices 108A-N, information that facilitates the receipt of network resource requests, information that facilitates the identification and/or collection of tag information, information that facilitates the generation and/or identification of representative values, information that facilitates the storage of tag and representative value information, and/or information that facilitates the generation of reports. The mapping information databases 134, which may include any number of internal and/or external databases, may store a wide variety of information associated with correspondences between tag information (e.g., tag sets, etc.) and representative values. Examples of suitable information that may be stored in the databases 134 include, but are not limited to, one or more tag sets, one or more representative values (e.g., hash values, compression function outputs, etc.), and/or information identifying correspondences between tag sets and representative values. Additionally, as desired, one or more suitable database management systems (DBMS) may be utilized to facilitate the management of the information stored in the data files 136 and/or databases 134.

The OS 138 may be a suitable module that facilitates the general operation of the service provider computer 102, as well as the execution of other program modules, such as the request processing modules 148, the host modules 149, and/or the reporting module 150. For example, the OS 138 may be, but is not limited to, Microsoft Windows®, Apple OSX™, Unix, a mainframe computer operating system (e.g., IBM z/OS, MVS, OS/390, etc.), or a specially designed operating system. The host modules 149 may include any number of suitable modules and/or applications configured to facilitate the establishment and management of various communications session with one or more other components of the system 100. For example, a host module 149 may include a suitable server component configured to host one or more Web pages or other graphical user interfaces accessible by the customer computers 104 and/or the user devices 108A-N. In certain embodiments, one or more requests may be received via a host module 149. Additionally, in certain embodiments, a wide variety of tag set and/or tag set mapping information may be received via a host module 149.

The request processing modules 148 may include any number of suitable software modules and/or applications that facilitate the processing of received requests and/or network messages. In operation, a request processing module 148 may receive a request associated with network resources. In certain embodiments, the request processing module 148 may be associated with an interceptor service that evaluates requests prior to the requests being delivered to network services. A wide variety of different types of requests may be received as desired in various embodiments including, but not limited to, a request to allocate one or more network or virtual resources, a request to utilize one or more resources, a request to launch a virtual machine, a request to terminate a virtual machine, a request to access one or more data objects (e.g., a GET request, etc.), a request to store one or more data objects (e.g., a PUT request, etc.), and/or a request to list data objects. In certain embodiments, once a request has been received, the request processing module 148 may facilitate authentication of the request. For example, identification and/or access information (e.g., log-in information, certificates, tokens, etc.) associated with a requester (e.g., a user 110, a customer, etc.) may be validated in order to determine whether the requester is authorized to submit the request for processing. Additionally, a wide variety of identity information, such as customer, user, and/or account identity information, may be determined.

Additionally, the request processing modules 148 may identify or determine a set of one or more tags and/or a representative value associated with the tag set. In certain embodiments, a request may include a representative value for a tag set. For example, a user device 108A-N, customer computer 104, or other requester may generate a representative value associated with a tag set, and the representative value may be included in or otherwise associated with the received request. Additionally, as desired, a tag set and/or tag mapping information establishing a correspondence between the representative value and the tag set may be received independently of the request, for example, via a Web interface or batch transmission.

In other embodiments, a request may include a tag set of one or more tags, and the tag set may be processed in order to generate or determine a representative value that can be associated with the request. In other words, a tag set may be explicitly defined by a requester. In yet other embodiments, information associated with the request may be utilized to implicitly determine a tag set for the request. For example, one or more tags associated with an underlying requested resource (or resources) may be identified as tags for the request. As another example, identification information for a customer, user 110, or other requester may be utilized to identify one or more tags to associate with the request. As yet another example, an owner of an underlying requested resource (e.g., a customer to whom the resource is assigned, etc.) may be identified and utilized to determine one or more tags to associate with the request. In this regard, certain resources may be shared by multiple customers and/or users. Once a tag set has been implicitly determined, a representative value may be generated or determined for the tag set.

A wide variety of different types of tags may be utilized as desired. In certain embodiments, a customer may be permitted to define one or more tags to associate with a request. In this regard, a customer may be permitted to decorate or mark resource usage and/or operations along any number of desired dimensions and/or metrics (e.g., customer products, user criteria, etc.). Additionally, any number of tags may be associated with any given request, and tags may include any desired length. Alternatively, an empty tag set may be established or specified. Each tag may include a key-value pair. For example, a tag of "project=Trinity" may have a key of "project" and an associated value of "Trinity." As another example, a tag of "cost-center=5562" may have a key of "cost-center" and a value of "5562."

In embodiments in which a received request includes a representative value, the request processing modules 148 may route or otherwise direct delivery of the request to a suitable network service, such as a network server computer 106, for additional processing. For example, a request may be delivered to a virtual machine, utilized to establish a virtual machine, and/or utilized to allocate additional resources. In certain embodiments, a request may be delivered to a network server computer 106 via a suitable Web service command or API call. Additionally, as set forth above, mapping information for the representative value may be independently received. For example, a customer may access a Web server hosted by or otherwise associated with a service provider computer 102, and the customer may provide mapping information to the service provider computer 102 via any number of suitable Web sites. As another example, a customer may provide mapping information to a service provider computer 102 via real-time and/or asynchronous (e.g., batch, etc.) communications.

In embodiments in which a received request does not include a representative value, a tag set for the request (e.g., an explicit tag set, an implicit tag set, etc.) may be identified or determined as described above. The tag set may be utilized to generate or determine a representative value to be associated with the request. A wide variety of suitable methods and/or techniques may be utilized as desired to generate a representative value. For example, one or more hashing operations may be performed on a tag set to generate a representative value. Any number of suitable hash functions may be utilized as desired including, but not limited to, SHA-128, SHA-256, MD4, MD5, MD6, BLAKE-256, ECOH, FSB, GOST, HAVAL, Spectral Hash, any other cryptographic hash functions, and/or any suitable non-cryptographic hash function. As another example of generating a representative value, any number of suitable compression functions may be utilized to process the tag set to generate a representative value. Regardless of the technique utilized to generate a representative value, the representative value may include any data that identifies an underlying tag set and/or that can be utilized to determine the underlying tag set.

As desired, a tag set may be normalized prior to the generation or other determination of a representative value. For example, the various tags included in a tag set may be organized in order to be case independent. In this regard, similar tags, such as "project=Trinity," "PROJECT=Trinity," and "project=TRINITY," may be treated as equal tags. As another example, the tags included in a tag set may be sorted or organized by keys and/or by values. In this regard, tag sets including the same tags in different orders may result in the generation of the same representative value (e.g., hash, etc.), thereby reducing the number of representative values to be tracked. For example, the tag sets of (project=Trinity, cost-center=5562, user=thrane) and (user=thrane, cost-center=5562, project=Trinity) are logically the same tag set and may be sorted or organized as such, thereby resulting in the same generated representative value. A wide variety of sorting techniques may be utilized as desired. For example, in one embodiment, the tags in a tag set may be lexically ordered first by key and then by value. Using this mechanism, the normalized form of the tag sets above would be (cost-center=5562, project=Trinity, user=thrane).

Once a representative value has been determined for a tag set, the tag set may be removed from the request, and the representative value may be associated with the request. The request processing modules 148 may then route or otherwise direct delivery of the request and the associated representative value to a suitable network service, such as a network server computer 106, for additional processing. Additionally, the request processing modules 148 may direct storage of information associated with the generated representative value and the underlying tag set. For example, mapping information between the representative value and the corresponding tag set may be stored. In certain embodiments, the request processing modules 148 may include or invoke a tag set registration service that facilitates the storage and/or registration of mapping information. Each individual tag key and value for the key may also be registered and stored. As desired, an index of the tag sets that employ each key and key-value pair may also be maintained. As explained in greater detail below, the index may facilitate the reconstruction of tag sets from representative values. Further, as desired in various embodiments, representative values and tag sets may be stored and/or registered in association with a customer or customer account. For example, a separate registry may be maintained for each customer. As another example, a customer identifier may be included in each stored record.

In certain embodiments, prior to the storage of tag set and representative value information, a cache or other suitable memory containing information associated with recently processed tag sets and/or representative values (e.g., information associated with previously processed requests, etc.) may be accessed. The tag set and/or representative value for the request may be compared to information included in the cache in order to determine whether the tag set and/or representative value has already been stored and/or registered. In the event that mapping information has already been stored, then storage of mapping information associated with the request may be suppressed. In other embodiments, a cache or other memory containing recently processed tag sets and associated representative values may be accessed prior to the generation of a representative value for a request. In the event that a tag set included in a request matches or corresponds to a tag set included in the cache, then the stored representative value may be accessed from the cache and associated with the request.

A few examples of the operations that may be performed by the request processing modules 148 are described in greater detail below with reference to FIGS. 4-6. Additionally, although the request processing modules 148 are described as providing a wide variety of functions, in certain embodiments, separate modules may perform specific functions. For example, a first module may facilitate identification of a tag set included in a request, a second module may facilitate normalization of a tag set, a third module may facilitate the generation of a representative value, and a fourth module may facilitate the storage of mapping information associated with a tag set and representative value. Indeed, any number of processing modules and/or applications may be utilized as desired in various embodiments.

The reporting module 150 may include any number of suitable software modules and/or applications that facilitate the reconstruction of tag sets from representative values and/or the generation of one or more reports associated with processed requests. In certain embodiments, the reporting module 150 may be in communication with a suitable metering system that tracks requests processed by the network server computers 106 and/or with a billing system that generates bills for the customers. In operation, the reporting module 150 may receive information associated with any number of processed requests. For example, the reporting module 150 may receive information associated with requests processed by the network server computers 106. As desired, the processed requests may be organized in accordance with any number of metrics, such as processing time, identification of customers, identification of underlying resources, and/or representative values. In other embodiments, a suitable metering system or component may track a number of processed requests associated with each representative value and customer combination. In this regard, a single copy of each representative value may be stored by the metering system along with a number of instances that the representative value was utilized in association with requests.

For each request (or representation of a group of requests), the reporting module 150 may identify an associated representative value. The reporting module 150 may then access stored tag matching information and compare the representative value to at least a portion of the stored information in order to determine whether mapping information is available for the representative value. The stored information may include information stored by the request processing modules 148 and/or information received from external devices, such as the customer computers 104. In the event that mapping information is available for the representative value, a corresponding tag set associated with the representative value may be identified. The tag set may then be utilized for a wide variety of reporting purposes.

In certain situations, multiple requests containing the same tag set or representative value may be received and processed by the service provider computers 102 and/or the network server computers 106. Accordingly, if the request processing modules 148 fail to store mapping information for a request, it is likely that mapping information will be successfully stored for another request, thereby facilitating subsequent reconstruction of the tag sets associated with the requests. However, in certain situations, mapping information for a specific representative value may not be available. In these situations, a wide variety of tag set determination processes or procedures may be implemented as desired. In certain embodiments, a combinatorial search (or other operation such as a statistical analysis, etc.) of other representative values and associated tag sets may be performed in an attempt to determine a tag set for a representative value. For example, with a known hashing function (or compression function or other method for determining representative values), the tag set of (cost-center=5562, project=Trinity) may be mapped to a first known representative value, and the tag set of (project=Trinity, user=thrane) may be mapped to a second known representative value. Given these known representative values and corresponding tag sets, a representative value having no stored mapping information may be determined to correspond to a tag set of (cost-center=5562, user=thrane). In other embodiments, a request for mapping information associated with a representative value may be communicated to a customer computer 104, and a tag set may be identified based upon an evaluation of one or more received responses.

Once tag sets associated with processed requests have been reconstructed from representative values, any number of reports may be generated by the reporting module 150. For example, billing reports, resource usage reports, and/or audit reports may be generated for various customers of the service provider. In certain embodiments, information included in a report may be identified and/or organized based upon any number of tags. In this regard, a customer may define parameters to be utilized in the generation of reports and/or to be tracked by reports. In certain embodiments, a customer may specify one or more parameters for a report (e.g., a type of report, one or more tags identifying information to include in a report, one or more tags for organizing information in a report, etc.). Requests and/or request processing information satisfying the specified one or more parameters may be identified, and the report may be generated. As desired, customer parameters may be stored in a suitable customer profile and/or received from a customer system or device in association with a report generation request. In other embodiments, one or more default reports may be generated. Once a report has been generated, the report may be communicated to any number of desired recipients, such as a customer computer 104, utilizing any number of suitable communication techniques (e.g., email, short message service messaging, batch or other asynchronous transmission, etc.). Alternatively, a report may be made available for download and/or viewing by a customer.

A few examples of the operations that may be performed by the reporting module 150 are described in greater detail below with reference to FIGS. 4 and 7. Additionally, although the reporting module 150 is described as a single module, any number of modules may be utilized to facilitate the functionality described for the reporting module 150. Additionally, in certain embodiments, operations of the reporting module 150 and one or more of the request processing modules 148 may be performed by a single module.

With continued reference to the service provider computer 102, the one or more input devices 130 and/or output devices 132 may facilitate user interaction with the service provider computer 102. Examples of suitable input and output devices 130, 132 include, but are not limited to, a display, a keypad, a mouse, a pointing device, a control panel, a touch screen display, a remote control, a microphone, a speaker, etc. As desired, one or more suitable input/output (I/O) interfaces may facilitate communication between the service provider computer 102 and the various I/O devices. The one or more communication interfaces 128 may facilitate connection of the service provider computer 102 to one or more suitable networks, for example, the networks 112 illustrated in FIG. 1. In this regard, the service provider computer 102 may receive and/or communicate information to other components of the system 100.

With continued reference to FIG. 1, any number of network server computers 106 may be utilized as desired in various embodiments. In certain embodiments, the network server computers 106 and the service provider computers 102 may be combined. In other embodiments, the network server computers 106 may be in communication with the service provider computers 102 via any number of suitable networks 112, such as one or more internal service provider networks, etc. The network server computers 106 may include any number of suitable processor-driven devices that facilitate the processing of network-based and/or virtualization environment requests. In certain embodiments, the network server computers 106 may be configured to host and/or execute virtual machines on behalf of customers. In some example embodiments, the network server computers 106 may include one or more server computers, mainframe computers, networked computers, desktop computers, personal computers, laptop computers, mobile computers, and/or other processor-based devices. The network server computers 106 may utilize one or more processors 152 to execute computer-readable or computer-executable instructions to facilitate the operations of the network server computers 106. As a result of executing these computer-executable instructions, a special-purpose computer or particular machine may be formed that facilitates the processing of network-based and/or virtualization requests.

An example network server computer 106 will now be described. In addition to having one or more processors 152, the network server computer 106 may further include one or more memory devices 154 (also referred to as memory 154), one or more input/output devices 160, and/or one or more communication connections and/or interfaces 158. The memory devices 154 may include any number of suitable memory devices, such as caches, read-only memory devices, random access memory devices, flash memory devices, magnetic storage devices, removable and/or non-removable storage devices 156 (e.g., memory cards, etc.). As desired, the memory devices 154 may include internal memory devices and/or external memory devices in communication with the network server computer 106. The memory devices 154 may store data, executable instructions, and/or various program modules utilized by the processors 152. Examples of data that may be stored by the memory devices 154 include data files and/or any number of databases and/or other memory constructs, such as one or more resource records databases 163, and/or any number of suitable program modules and/or applications that may be executed by the processors 152, such as an operating system (OS) 162 and/or any number of network service modules 164.

Stored data files may include any suitable data that facilitates the operation of the network server computer 106 and/or the interaction of the network server computer 106 with one or more other components of the system 100. The resource records databases 163, which may include any number of internal and/or external databases, may store a wide variety of information associated with processed requests. Examples of suitable information that may be stored in the databases 163 include, but are not limited to, records and/or metering information associated with processed network-based requests, such as records associated with the processing of requests to execute virtual machines, requests to close or terminate virtual machines, requests to access or get data, requests to store or put data, requests to list available data items, requests to allocate one or more resources, requests to use one or more resources, and/or other suitable requests. As desired, a wide variety of information may be stored in association with a record, such as a customer identifier, one or more user identifiers, identification information for various request types, and/or a representative value.

The OS 162 may be a suitable module that facilitates the general operation of the network server computer 106, as well as the execution of other program modules, such as the network service modules 164. For example, the OS 162 may be, but is not limited to, Microsoft Windows®, Apple OSX™, Unix, a mainframe computer operating system (e.g., IBM z/OS, MVS, OS/390, etc.), or a specially designed operating system. The network service modules 164 may include any number of suitable software modules and/or applications that facilitate the processing of network-based requests. In operation, the network service modules 164 may provide virtualization and/or program execution services on behalf of customers of the service provider. For example, the network service modules 164 may implement and execute virtual machines on behalf of customers. In association with the implementation and/or execution of a virtual machine, the network service modules 164 may allocate network resources on behalf of customers. Additionally, the network service modules 164 may store data and/or access data on behalf of customers. Indeed, a wide variety of different types of services may be provided by the network service modules 164.

In certain embodiments, the network service modules 164 may receive requests that have been pre-processed by the service provider computers 102. For example, the service provider computers 102 may receive requests from the customer computers 104 and/or user devices 108A-N, and the service provider computers 102 may communicate requests to the network service modules 164 via any number of suitable internal service provider networks and/or utilizing any number of suitable techniques, such as API and/or Web commands. In other embodiments, the network service modules 164 may directly receive requests from the customer computers 104 and/or user devices 108A-N. For example, the network service modules 164 may host communications sessions (e.g., Web sessions, etc.), and requests may be received via the hosted communications sessions.

Additionally, during the processing of a request or following the processing of a request, the network service modules 164 may store or direct the storage of information associated with the processed request. For example, the network service modules 164 may store information associated with the request in the resource records database 163. As another example, the network service modules 164 may direct a metering system or metering component to store information associated with the request in the resource records database 163. In this regard, information associated with the request may be utilized to generate a wide variety of different reports.

With continued reference to the network server computer 106, the one or more input/output (I/O) devices 160 may facilitate user interaction with the network server computer 106. Examples of suitable I/O devices 160 include, but are not limited to, a display, a keypad, a mouse, a pointing device, a control panel, a touch screen display, a remote control, a microphone, a speaker, etc. As desired, one or more suitable I/O interfaces may facilitate communication between the network server computer 106 and the various I/O devices. The one or more communication connections or interfaces 158 may facilitate connection of the network server computer 106 to one or more suitable networks, for example, the networks 112 illustrated in FIG. 1. In this regard, the network server computer 106 may receive and/or communicate information to other components of the system 100.

With continued reference to FIG. 1, any number of customer computers 104 may be in communication with the service provider computers 102 and/or the network server computers 106. A customer computer 104 may be a suitable processing device or combination of devices that facilitates the provision of network resource requests to the service provider computers 102 and/or the network server computers 106. Additionally, in certain embodiments, the customer computer 104 may be a suitable processing device or combination of devices that facilitates the provision of mapping information that may be utilized to reconstruct tag sets from representative values. For example, a customer computer 104 may be utilized to access a suitable Web server that facilitates the receipt of mapping information. As another example, a customer computer 104 may communicate a file of mapping information to the service provider computers 102. As desired, a customer computer 104 may include one or more processor-driven devices that include components similar to those described above for the service provider computers 102. For example, a customer computer 104 may include one or more processors, memory devices, I/O interfaces, and/or network interfaces.

Additionally, any number of user devices 108A-N may be present. Examples of suitable user devices include, but are not limited to, personal computers, tablet computers, mobile devices (e.g., mobile phones, personal digital assistants, etc.), electronic reader devices, digital cameras, key fobs, automotive information interfaces, in-flight entertainment devices, and/or any other suitable device capable of generating a request associated with network-based resources or an operation that results in a request associated with network-based resources. In operation, a user 110 may utilize a user device (generally referred to as user device 108) for a wide variety of different purposes. For example, the user 110 may utilize the user device 108 to browse the Internet, to execute an application, to play a game, to store data (e.g., pictures, music, video, etc.), and/or for a wide variety of other purposes. In doing so, one or more requests for network-based resources may be generated and output for communication to the service provider computers 102.

As desired, a user device 108 may be a processor-driven device that includes components similar to those described above for the service provider computers 102. For example, a user device 108 may include one or more processors 170, memory devices 172, I/O interfaces, and/or network interfaces. The memory devices 172 may be configured to store a wide variety of suitable computer-executable instructions, applications, and/or modules that may be utilized and/or executed by the processors 170. For example, the memory devices 172 may be configured to store any number of suitable user applications 174 that may request allocation and/or use of network-based resources, such as a suitable browser application that accesses a Web service (e.g., a Web service hosted by the customer computers 104, etc.) and/or a dedicated application (e.g., a mobile device or tablet application, etc.).

A wide variety of suitable networks 112 may be utilized in association with various embodiments. These networks 112 may include any telecommunication and/or data network, whether public, private, or a combination thereof, including a local area network, a wide area network, an intranet, the Internet, intermediate handheld data transfer devices, a public-switched telephone network (PSTN), a cellular network, and/or any combination thereof and may be wired and/or wireless. Due to network connectivity, various methodologies as described herein may be practiced in the context of distributed computing environments. It will also be appreciated that the various networks may include a plurality of networks, each with devices such as gateways and routers for providing connectivity between or among networks. Additionally, instead of, or in addition to, a network, dedicated communication links may be used to connect various devices in accordance with an example embodiment.

The system 100 shown in and described with respect to FIG. 1 is provided by way of example only. Numerous other operating environments, system architectures, and device configurations are possible. Other system embodiments can include fewer or greater numbers of components and may incorporate some or all of the functionalities described with respect to the system components shown in FIG. 1. Accordingly, embodiments and aspects should not be construed as being limited to any particular operating environment, system architecture, or device configuration.

Additionally, in certain embodiments, a service provider system that processes and/or evaluates requests associated with network-based resources may include any number of components organized into any number of suitable architectures and/or configurations. For example, as shown in FIG. 1, a service provider system may include one or more service provider computers 102 and/or one or more network server computers 106. As desired, these computers 102, 106 may be in communication with one another via any number of suitable internal networks. Indeed, the various computers 102, 106 of the service provider may be implemented as a wide variety of different systems and/or architectures.

Figure 2:
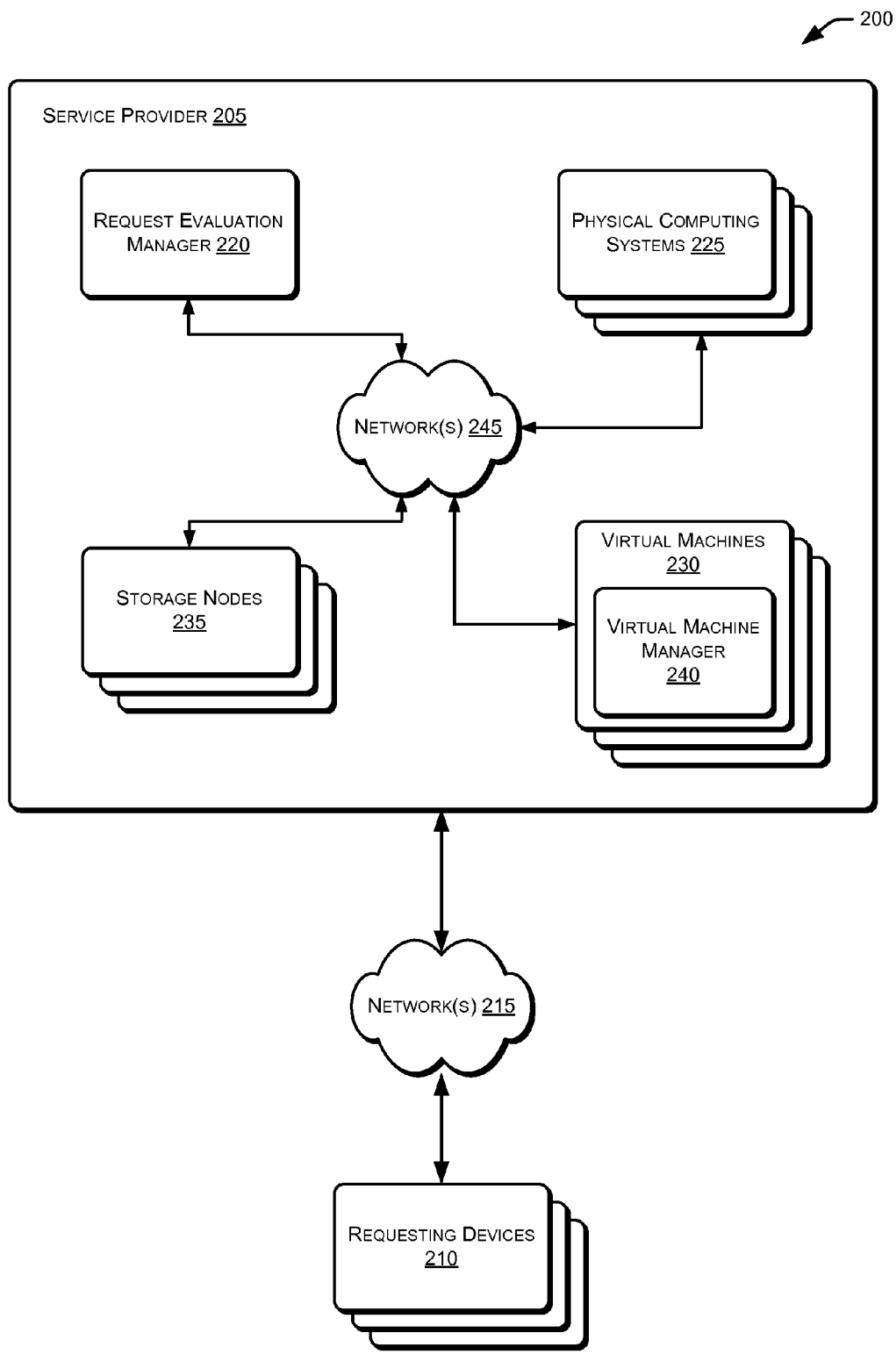
FIG. 2 illustrates a block diagram of one example implementation of a system that provides and manages network resources.

FIG. 2 illustrates a block diagram of one example implementation or architecture 200 of a service provider or other system that provides and manages network resources. In certain embodiments, the architecture 200 of FIG. 2 may provide virtualization services on behalf of customers. With reference to FIG. 2, a service provider system 205 (also referred to as service provider 205) may host a Web service or collection of Web services that provide computing resources for rent to use for Web and/or other application hosting. For example, the service provider 205 may manage requests from a customer to execute a program, set of programs, or to store data on behalf of the customer. At least some of the customer computing systems may be remote from the service provider 205. For example, any number of requesting devices 210 associated with the customer, such as customer computers and/or user devices, may be in communication with the service provider 205 via one or more suitable networks 215, such as the Internet, one or more private networks, and/or any other networks. In this regard, the requesting devices 210 may communicate requests associated with network-based resources to the service provider 205 via the networks 215, and the requests may be processed as described above with reference to FIG. 1.

The service provider 205 may include any number of nodes, such as a request evaluation manager 220, any number of physical computing systems 225, any number of virtual machines 230, and/or any number of storage nodes 235. In certain embodiments, the virtual machines 230 may be hosted on one or more of the physical computing systems 225. For example, a host computing system can provide one or more virtual machines 230. Additionally, at least one physical computing system 225 may include a virtual machine manager 240 (e.g., a hypervisor or other virtual machine manager, etc.) that manages the virtual machines, the allocation of resources to the virtual machines, and/or the execution of programs.

In addition to providing virtualization services, the service provider 205 may provide access to any number of storage nodes 235 that provide mass storage of data, programs, and/or customer information. The storage nodes 235 may include any type of persistent data storage, for example, non-volatile memory devices such as hard disk drives, optical disk drives, etc. As desired, the physical computing systems 225 and/or the virtual machines 230 may access the storage nodes 235 via any number of suitable service provider networks 245. The service provider networks 245 may include any number of networking devices, such as switches, edge routers, cores, routers, etc. Additionally, in certain embodiments, the service provider networks 245 may be different from the networks 215 that facilitate communication with requesting devices 210. For example, the service provider networks 245 may be internal networks that facilitate communication between service provider system components, such as internal Web commands and/or API requests.

The request evaluation manager 220, which may be implemented on one of the physical computing systems 225 or in a stand-alone system or component, may facilitate the pre-processing of requests associated with network-based resources. In operation, a requesting device 210 may provide a request to the service provider 205, and the request may be intercepted by the request evaluation manager 220. The request evaluation manager 220 may perform one or more of request authentication, the identification of a tag set included in the request, the generation of a representative value, and/or the storage of mapping information associated with a tag set and representative value. The request evaluation manager 220 may then route or otherwise communicate the request to one or more other computing nodes for further processing.

The architecture 200 illustrated in FIG. 2 is merely one example of an implementation or configuration of a service provider system. Other architectures and/or configurations may be utilized as desired in various embodiments. The other architectures may include any suitable arrangement of components and/or network connections that facilitate communication between the components.

Operational Overview

Figure 3A:
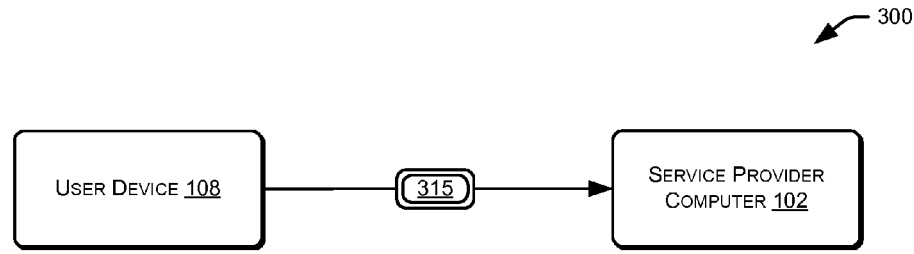
FIGS. 3A-3C illustrate example data flows for receiving requests associated with the allocation and/or use of network resources.
Figure 3B:
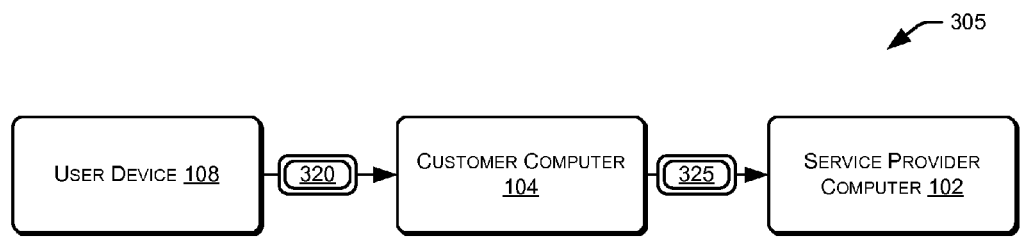
Figure 3C:
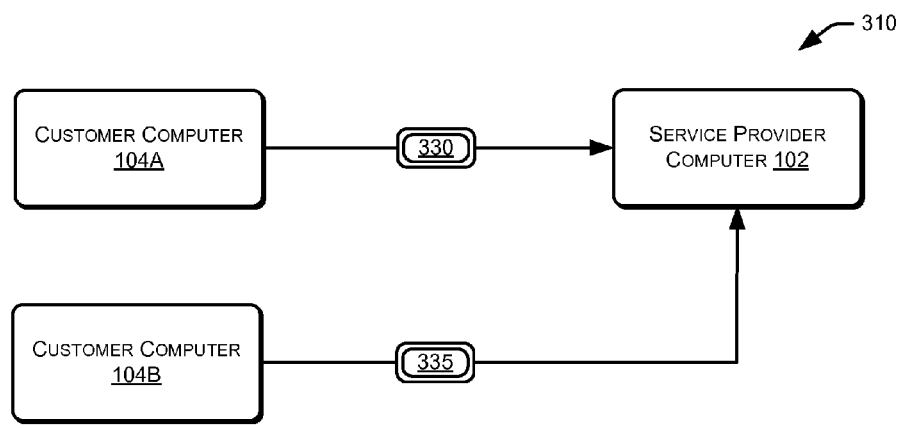

As set forth above, a wide variety of different types of requests associated with network-based resources and/or virtualization environments may be received and processed by a service provider computer, such as one or more of the service provider computers 102 illustrated in FIG. 1. Additionally, these requests may be received from any number of suitable requesting devices. FIGS. 3A-3C illustrate example data flows 300, 305, 310 for receiving requests associated with the allocation and/or use of network resources. Turning first to the data flow 300 of FIG. 3A, a user device, such as one of the user devices 108A-N, may communicate a request 315 directly to the service provider computer 102. For example, a user device (generally referred to as user device 108) may execute an application (e.g., a mobile application, a tablet application, etc.) that generates and communicates the request 315 to the service provider computer 102.

With respect to the data flow 305 of FIG. 3B, a user device 108 may communicate a suitable request 320 to a customer computer, such as one of the customer computers 104 illustrated in FIG. 1. For example, the user device 108 may execute an application or access a network service (e.g., a Web service, etc.) that generates the request 320 that is delivered to the customer computer 104. The customer computer 104 may then generate a request 325 associated with network-based resources, and the customer computer 104 may communicate the generated request 325 to the service provider computer 102. Additionally, although the customer computer 104 is described as generating a request 325, in certain embodiments, the customer computer 104 may forward the request 320 generated by the user device 108 to the service provider computer 102.

Turning now to the data flow 310 of FIG. 3C, certain network-based resources may be shared by multiple customer computers. For example, a first customer computer 104A may generate a request 330 for network-based resources, and the first customer computer 104A may deliver the request 330 to the service provider computer 102. In this regard, network-based resources may be allocated on behalf of the first customer computer 104A. A second customer computer 104B may then generate a request 335 associated with accessing and/or otherwise utilizing the resources allocated to the first customer computer 104A, and the request 335 may be communicated to the service provider computer 102. As desired, the request 335 generated by the second customer computer 104B may include suitable authentication information that facilitates access to resources owned by the first customer computer 104A. In this regard, various entities may share common network-based resources and, as desired, enter into data sharing arrangements.

The data flows 300, 305, 310 of FIGS. 3A-3C illustrate a few examples for providing requests to a service provider system. Other methods and/or techniques for delivering requests may be utilized. Additionally, regardless of the technique utilized to deliver a request to the service provider system, a wide variety of tag evaluation and/or mapping services may be performed by the service provider system. FIG. 4 illustrates an example data flow 400 for processing requests for network resources and generating one or more reports associated with the requests. Variations of the data flow 400 illustrated in FIG. 4 may be utilized in accordance with various embodiments, and the data flow 400 is provided by way of example only.

Figure 4:
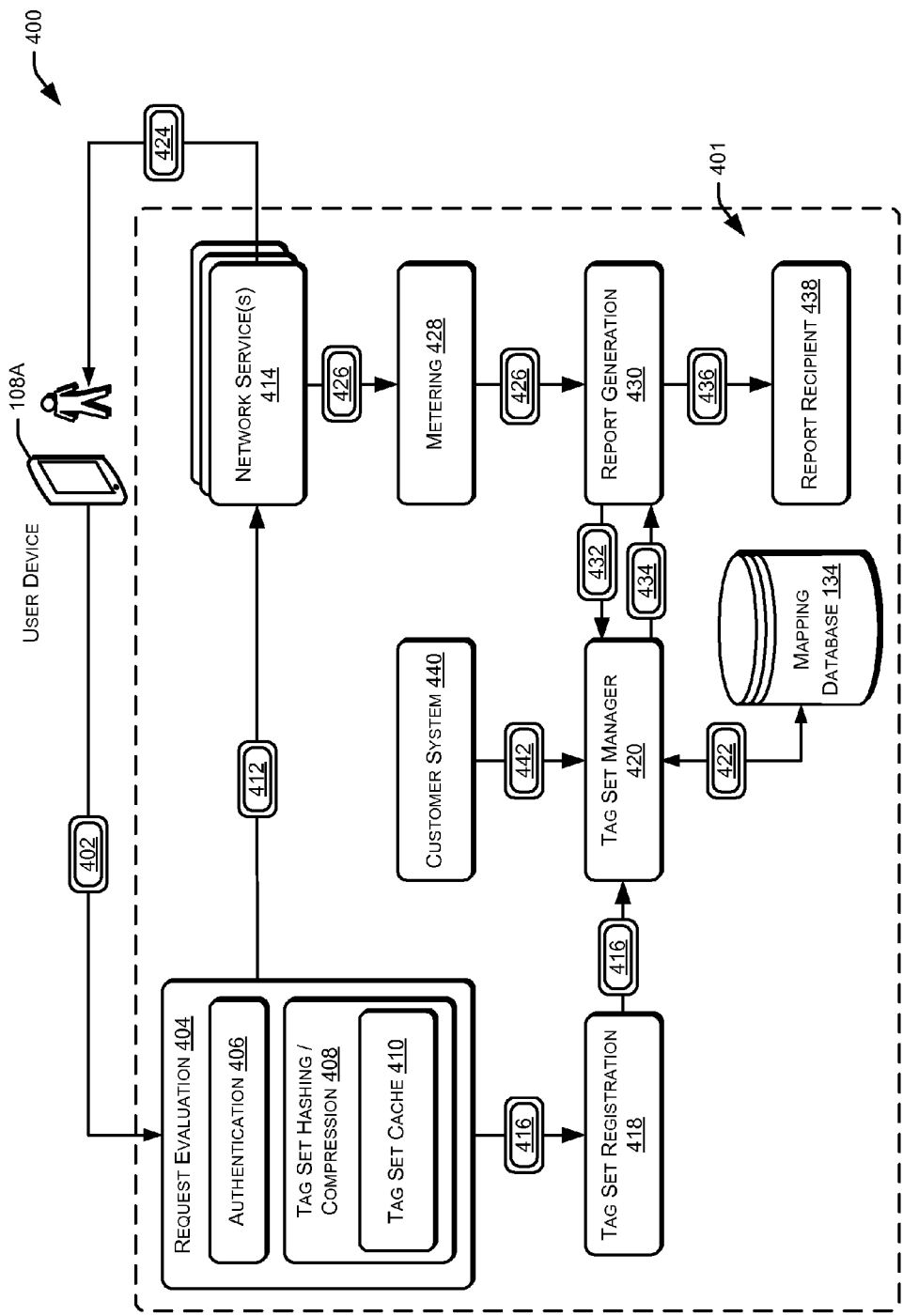
FIG. 4 illustrates an example data flow for processing requests for network resources and generating one or more reports associated with the requests.

With reference to FIG. 4, a request 402 for network-based resources may be delivered to a service provider system 401 (also referred to as service provider 401) from a suitable requesting device, such as one of the user devices 108A illustrated in FIG. 1 (or from another suitable requesting device such as a customer computer). The request 402 may be intercepted by a suitable request evaluation service 404 configured to perform pre-processing on the request 402. In certain embodiments, information included in the request 402 may be utilized to perform an authentication service 406 for the request. For example, access credentials for a requesting entity may be verified and/or authenticated.

In certain embodiments, the received request 402 may include a representative value associated with the tag set for the request. In the event that the request 402, includes a representative value, the request 402 may be routed to any number of suitable network services 414 for processing. Otherwise, a tag set for the request 402 may be identified, and a representative value for the identified tag set may be determined. In certain embodiments, a tag set may be explicitly included in the request 402 (e.g., the user or a customer may define a tag set), and the included tag set may be identified. In other embodiments, a tag set may be implicitly determined utilizing a wide variety of suitable parameters. For example, a tag set associated with one or more underlying network resources (e.g., a requested resource, etc.) may be identified as a tag set for the request 402. As another example, a tag set associated with an authenticated user or customer may be identified as a tag set for the request. In other words, the authentication service may result in the identification of one or more tags to be associated with the request. As yet another example, a customer that owns one or more requested resources may be identified, and a tag set may be determined based at least in part upon the identity of the customer.

Once a tag set has been identified for the request 402, a representative value for the tag set may be determined utilizing any number of suitable techniques. For example, a tag set hashing and/or compression function 408 may be performed on the tag set in order to determine a representative value for the tag set. As desired, the tag set may be normalized prior to performing a hashing and/or compression function. Additionally, the request 402 may be modified by associating the determined representative value with the request 402 and removing any tag information included in the request 402. The resulting modified request 412 may then be routed to any number of suitable network services 414 for processing.

In certain embodiments, a tag set cache 410 (or other memory) may be accessed utilizing the determined representative value and/or an underlying tag set. In this regard, a determination may be made as to whether mapping information for the representative value and the tag set has already been registered and stored. In the event that corresponding information is stored in the tag set cache 410, registration of new mapping information may be suppressed. Otherwise, mapping information 416 between the determined representative value and the associated tag set may be communicated to a tag set registration service 418. The tag set registration service 418 may direct a tag set manager service 420 (or tag set manager 420) to store a wide variety of information 422 associated with the tag set and corresponding representative value. For example, the tag set registration service 418 may register each individual tag key and value for the tag set, as well as mapping information for the tag set and the determined representative value. The tag set registration service 418 may also index the tag sets that employ or utilize the various key and key-value pairs. The tag set manager 420 may be configured to store mapping and/or registration information 422 in any number of suitable mapping databases 134 and/or other logical memory constructs. Additionally, as explained in greater detail below, during the subsequent generation of reports, the tag set manager 420 may be configured to return mapping information to one or more report generation services 430.

In addition to receiving mapping information from the tag set registration service 418, the tag set manager 420 may also receive mapping information 442 from any number of suitable customer systems 440. For example, in the event that a customer generates representative values prior to the communication of requests to the service provider 401, the customer may provide mapping information (e.g., tag set information associated with the representative values) to the service provider 401 and/or the tag set manager 420 via any number of suitable Web interfaces and/or file transfers. As another example, during the attempted reconstruction of a tag set from a representative value, a request for mapping information may be communicated to the customer system 440, and mapping information 442 may be received in response to the request (e.g., received via a Web interface, file transfer, etc.).

Once the request 402 is pre-processed by the request evaluation service 404, the request 402 or a modified request 412 may be routed or otherwise communicated to any number of suitable network services 414. The network services 414 may perform a wide variety of suitable processing on a received request and, as desired, the network services 414 may direct the communication of a response 424 to the request 402 to the user device 108A (or other requesting device). For example, the network services 414 may initiate a virtual machine, allocate resources, access data values, store data values, and/or perform a wide variety of other suitable processing in response to a received request. Additionally, the network services 414 may treat the representative value as a relatively opaque identifier that is applied to one or more metering records associated with a customer. For example, the network services 414 may associate the representative value with a resource that is created or allocated for use with metering resource consumption. As another example, the network services 414 may use the representative value during the metering of allocated resource usage. As desired, metering information 426 may be provided to and/or maintained by a metering service 428 or metering system based upon the processing of the request by the network services 414.

In certain embodiments, the metering service 428 may aggregate usage records based upon representative values. The metering service 428 may also provide at least a portion of the metering information 426 to a report generation service 430 to facilitate the generation of any number of reports associated with the usage of network-based resources, such as billing reports, usage reports, and/or audit reports organized in accordance with any number of suitable metrics and/or tags. Based at least in part upon representative values included in the received metering information 426, the report generation service 430 may communicate one or more requests 432 for mapping information (or requests for associated tag sets) to the tag set manager 420. In response to the received one or more requests 432, the tag set manager 420 may return mapping and/or tag information 434 to the report generation service 430. In this regard, tag sets for any number of representative values may be reconstructed for reporting purposes. Additionally, the report generation service 430 may utilize at least a portion of the metering information 426 and the mapping information 434 to generate any number of reports 436. Once generated, a report 436 may be communicated by the report generation service 430 to any number of suitable report recipients 438, such as a customer device.

Figure 5:
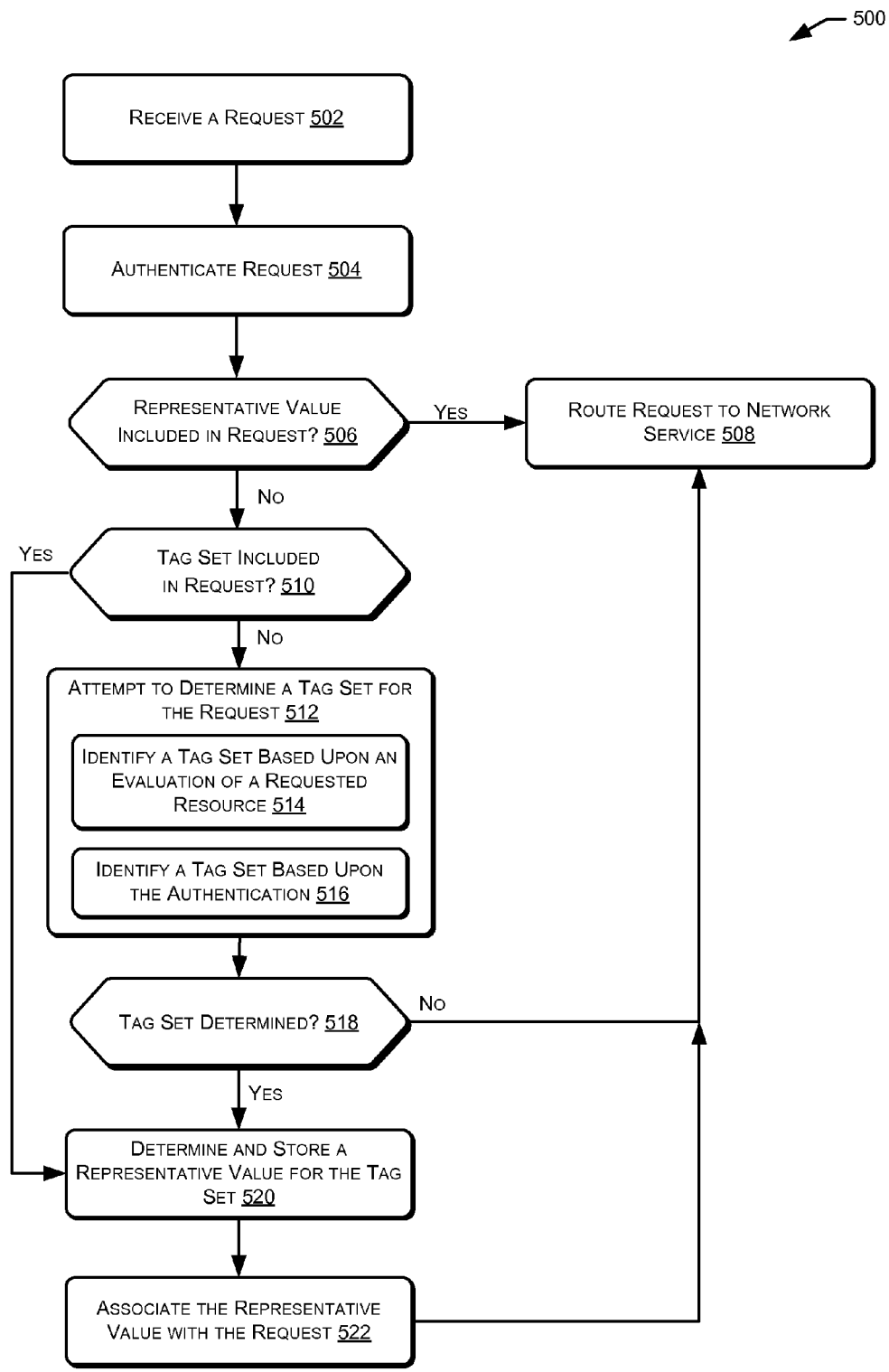
FIG. 5 illustrates a flow diagram of an example method for processing a network resource request and providing the request to an appropriate network service.

FIG. 5 illustrates a flow diagram of an example method 500 for processing a network resource request and providing the request to an appropriate network service. In certain embodiments, the operations of the method 500 may be performed by one or more suitable service provider computers, such as the service provider computers 102 illustrated in FIG. 1. The method 500 may begin at block 502.

At block 502, a request associated with network-based resources may be received, such as a request to allocate one or more network or virtual resources, a request to utilize one or more resources, a request to launch a virtual machine, a request to terminate a virtual machine, a request to access one or more data objects (e.g., a GET request, etc.), a request to store one or more data objects (e.g., a PUT request, etc.), and/or a request to list data objects. At block 504, the request and/or a requesting entity (e.g., a user, a customer, etc.) may be authenticated. For example, identification and/or access information (e.g., log-in information, certificates, tokens, etc.) associated with a requester may be validated in order to determine whether the requester is authorized to submit the request for processing. Additionally, a wide variety of identity information, such as customer, user, and/or account identity information, may be determined.

At block 506, a determination may be made as to whether a representative value is included in the received request. For example, the request may be parsed and/or otherwise evaluated in order to determine whether a representative value is included in the request. If it is determined at block 506 that a representative value is included in the request, then operations may continue at block 508, and the request may be routed or otherwise communicated to a suitable network service for additional processing. If, however, it is determined at block 506 that a representative value is not included in the request, then operations may continue at block 510. At block 510, a determination may be made as to whether a tag set is included in the request. For example, the request may be parsed and/or otherwise evaluated in order to determine whether a requester has defined one or more tags for the request. If it is determined at block 510 that a tag set is included in the request, then operations may continue at block 520 described in greater detail below. As desired, the tag set associated with the request may be modified utilizing any number of factors, such as identification information for a user, identification information for a customer, information associated with one or more underlying resources, etc.

If, however, it is determined at block 510 that no tag set is included in the request, then operations may continue at block 512, and an attempt to determine or identify a tag set for the request may be performed. In other words, one or more tags to be associated with the request may be implicitly determined. A wide variety of suitable methods and/or techniques may be utilized as desired to determine a tag set for the request. For example, at block 514, one or more tags associated with an underlying requested resource (or resources) may be identified as tags for the request. As another example, at block 516, a tag set may be identified based at least in part upon the authentication of the request. For example, identification information for a requester (e.g., a user, a customer, etc.) may be utilized to identify one or more tags to associate with the request. As yet another example, an owner of an underlying requested resource (e.g., a customer to whom the resource is assigned, etc.) may be identified and utilized to determine one or more tags to associate with the request.

At block 518, a determination may be made as to whether a tag set (e.g., an implicit tag set, etc.) has been determined for the request. If it is determined at block 518 that no tag set has been determined, then operations may continue at block 508, and the request may be routed or otherwise communicated to a suitable network service for additional processing. In other words, a tag set for the request may be empty. If, however, it is determined at block 518 that a tag set has been determined for the request, then operations may continue at block 520.

At block 520, which may be reached from either block 510 or block 518, a representative value for the tag set may be determined, and mapping information for the tag set and representative value may be stored. A wide variety of suitable methods and/or techniques may be utilized as desired to generate a representative value. A few example operations for determining a representative value and storing mapping information are described in greater detail below with reference to FIG. 6. Additionally, at block 522, the tag set may be removed from the request, and the representative value may be associated with the request. Operations may then continue at block 508, and the request may be routed or otherwise communicated to a suitable network service for additional processing. The method 500 may end following block 508.

Figure 6:
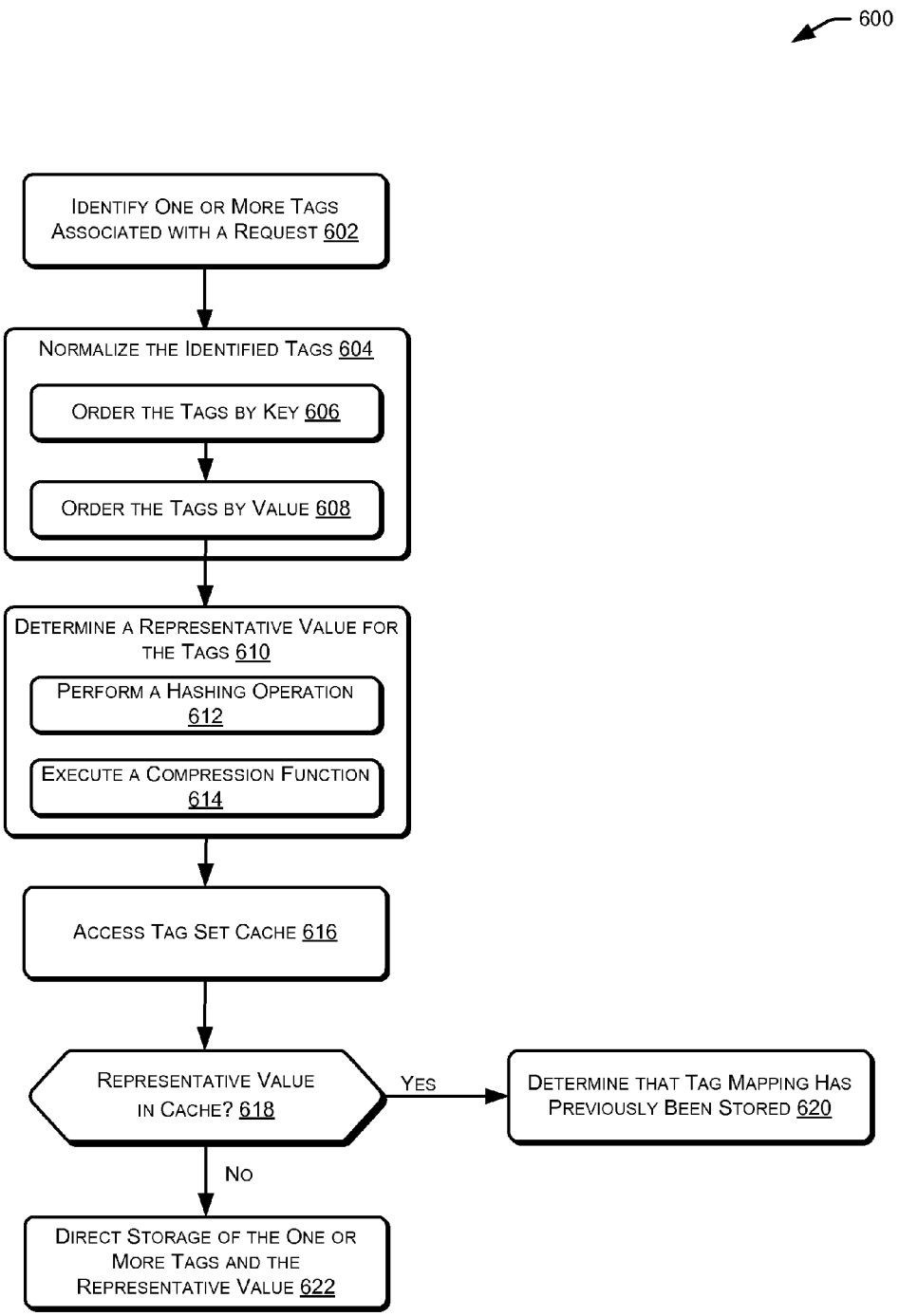
FIG. 6 illustrates a flow diagram of an example method for determining and storing a representative value for a tag set associated with a network resource request.

FIG. 6 illustrates a flow diagram of an example method 600 for determining and storing a representative value for a tag set associated with a network resource request. In certain embodiments, the method 600 may be one implementation of the operations performed at block 520 illustrated in FIG. 5. As such, the operations of the method 600 may be performed by one or more suitable service provider computers, such as the service provider computers 102 illustrated in FIG. 1. The method 600 may begin at block 602.

At block 602, one or more tags associated with a request may be identified. For example, one or more tags included in the request or determined utilizing information associated with the request, a requester, and/or requested resources may be identified. At block 604, the set of one or more tags may be normalized. A wide variety of suitable methods may be utilized to normalize the tags included in a tag set. For example, the tags in a tag set may be lexically ordered first by key at block 606, and then by value at block 608. Additionally, the tags may be treated in a case independent manner.

At block 610, a representative value may be determined for the tag set. A wide variety of suitable methods and/or techniques may be utilized as desired to determine a representative value for the tag set. For example, at block 612, a representative value may be determined by performing one or more hashing operations on the tag set. As another example, a representative value may be determined by executing one or more compression functions with respect to the tag set. Once a representative value has been determined at block 610, a tag set cache or other suitable memory containing information associated with recently processed tag sets and/or representative values may be accessed at block 616. A determination may then be made at block 618 as to whether the tag set and/or determined representative value for the request is included in the tag set cache. For example, the tag set and/or representative value for the request may be compared to information included in the cache in order to determine whether the tag set and/or representative value has already been stored and/or registered.

If it is determined at block 618 that the tag set and/or representative value is stored in the cache, then operations may continue at block 620. At block 620, a determination may be made that mapping information for the tag set and representative value has previously been stored, and operations of the method 600 may end. If, however, it is determined at block 618 that the tag set and/or representative value is not stored in the cache, then operations may continue at block 622. At block 622, storage of information associated with the generated representative value and the underlying tag set may be directed. For example, mapping information between the representative value and the corresponding tag set may be stored. Operations of the method 600 may then end following block 622.

Figure 7:
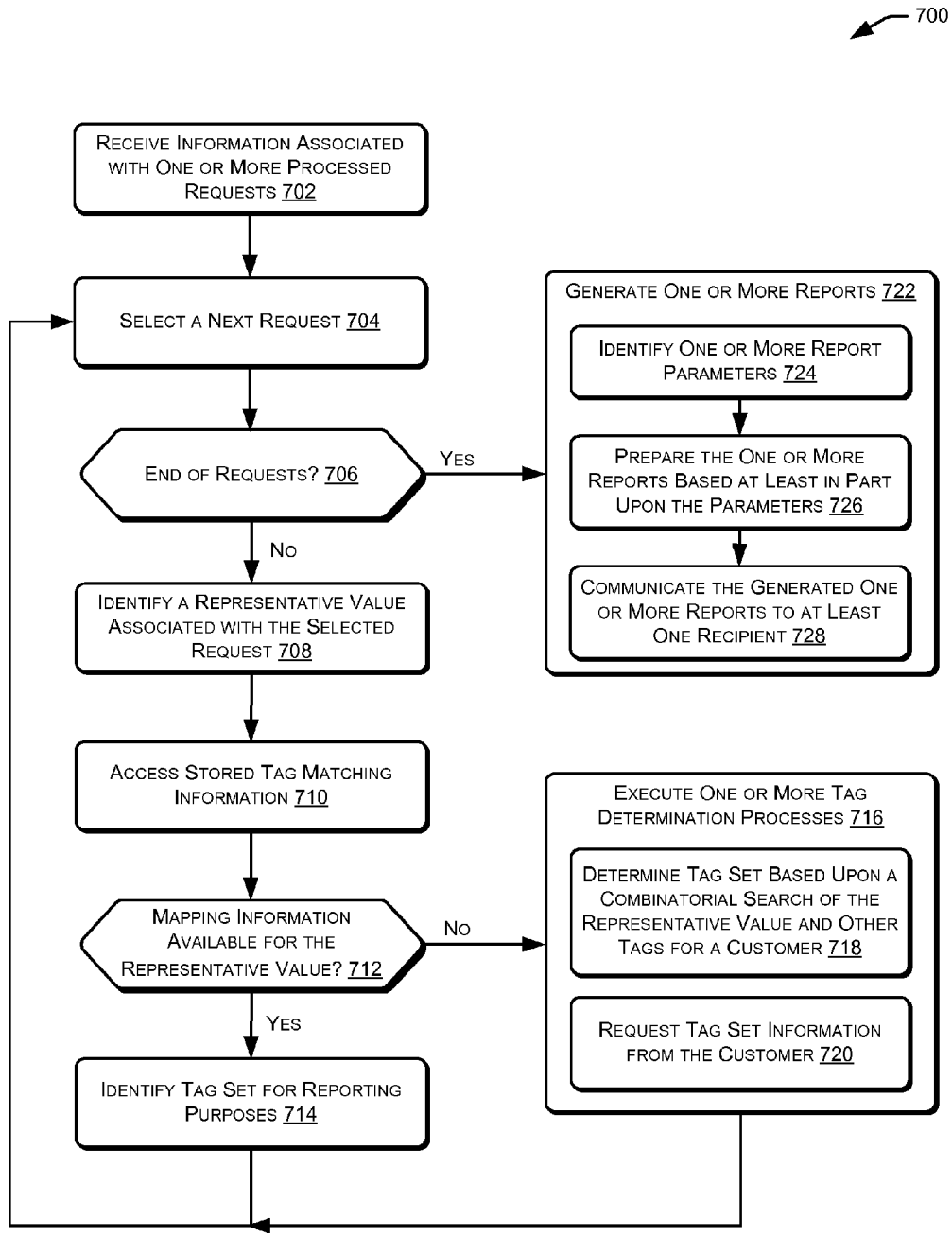
FIG. 7 illustrates a flow diagram of an example method for generating one or more reports associated with processed requests.

FIG. 7 illustrates a flow diagram of an example method 700 for generating one or more reports associated with processed requests. In certain embodiments, the operations of the method 700 may be performed by one or more suitable service provider computers, such as the service provider computers 102 illustrated in FIG. 1. The method 700 may begin at block 702.

At block 702, information associated with one or more processed requests may be received and/or identified. For example, information associated with one or more processed requests may be accessed from a metering system. As desired, the processed requests may be organized in accordance with any number of metrics, such as processing time, identification of customers, identification of underlying resources, and/or representative values. In other embodiments, the metering system may track a number of processed requests associated with each representative value and customer combination. In this regard, a single copy of each representative value may be stored by the metering system along with a number of instances that the representative value was utilized in association with requests.

At block 704, a next request may be selected for processing. A determination may then be made at block 706 as to whether the end of the requests has been reached. If it is determined at block 706 that the end of the requests has been reached, then operations may continue at block 722 described in greater detail below. If, however, it is determined at block 706 that the end of the requests has not been reached, then operations may continue at block 708. At block 708, a representative value associated with the selected request may be identified. Stored tag matching information may then be accessed and/or requested utilizing the identified representative value at block 710. Based at least in part upon an evaluation of the stored information, a determination may be made at block 712 as to whether mapping information (e.g., information associated with an underlying tag set) is available for the representative value. If it is determined at block 712 that mapping information is available for the representative value, then operations may continue at block 714, and the accessed information may be utilized to identify a tag set associated with the request for reporting purposes. Operations may then continue at block 704, and a next request may be selected for evaluation.

If, however, it is determined at block 712 that mapping information is not available for the representative value, then operations may continue at block 716, and one or more tag determination processes may be executed in an attempt to determine a tag set associated with the representative value. A wide variety of tag set determination processes or procedures may be implemented as desired. For example, at block 718, a combinatorial search of other representative values and associated tag sets may be performed in an attempt to determine a tag set for a representative value. As another example, at block 720, a request for tag set mapping information associated with a representative value may be communicated to a customer, and a tag set may be identified based upon an evaluation of one or more received responses. Following the execution of one or more tag determination processes, operations may continue at block 704, and a next request may be selected for processing.

Once the end of the requests has been reached and tag sets associated with processed requests have been reconstructed from representative values, operations may continue at block 722. At block 722, one or more reports associated with the requests may be generated utilizing tag set information associated with the requests. Example reports that may be generated include, but are not limited to, billing reports, resource usage reports, and/or audit reports. An example billing report may include breakouts and/or distributions of billing and/or fee information along any number of desired dimensions and/or criteria. Similarly, an example resource usage report may include a wide variety of detailed information associated with the allocation of network resource usage along any number of desired dimensions and/or criteria. An example audit report may include a wide variety of information associated with customers and/or users that access and/or utilize network-based resources and/or virtual machines. For example, an audit report may include information associated with customers (or requesting systems) that have invoked instances of virtual machines, as well as information associated with generated errors, exceptions, termination of virtual machines, and/or other events.

A wide variety of suitable methods and/or techniques may be utilized to generate a report. For example, at block 724, one or more parameters associated with information to be included in a report and/or desired report formatting may be identified. In certain embodiments, a customer may specify one or more parameters for a report (e.g., a type of report, one or more tags identifying information to include in a report, one or more tags for organizing information in a report, etc.). At block 726, one or more reports may be generated based at least in part upon the tag set information and one or more parameters. For example, requests and/or request processing information satisfying the specified one or more parameters may be identified, and a suitable report may be generated utilizing information associated with the requests. In this regard, reports may be generated in accordance with any desired customer metrics. For example, a report that allocates network-based resource usage and/or costs among customer-defined applications and/or cost centers may be generated. Once a report has been generated, the report may be communicated to any number of desired recipients, such as a customer, at block 728. Alternatively, a report may be made available for download and/or viewing by a customer or other recipient. Operations of the method 700 may then end following block 722.

The operations described and shown in the methods 500, 600, 700 of FIGS. 5-7 may be carried out or performed in any suitable order as desired in various embodiments. Additionally, in certain embodiments, at least a portion of the operations may be carried out in parallel. Furthermore, in certain embodiments, less than or more than the operations described in FIGS. 5-7 may be performed.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, certain embodiments may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system, comprising:
   at least one memory configured to store computer-executable instructions;
   at least one processor configured to access the at least one memory and execute the computer-executable instructions to:
   receive a request associated with the allocation or use of one or more network resources, wherein the request comprises a tag set;
   identify, based at least in part upon an evaluation of the received request, the tag set comprising one or more customer-defined tags associated with one or more performance metrics for the request;
   determine, via at least one hashing operation on the tag set, a representative value for the tag set;
   associate the representative value with the request;
   removing the tag set from the request;
   forward the request and the associated representative value to a network server for processing, wherein the network server directs storage of a record associated with the processing of the request;
   direct storage of information associated with the representative value and the tag set; and
   reconstruct, based at least in part upon the stored record and the stored information, the one or more tags to facilitate generation of one or more reports, wherein the one or more reports compromise at least one of (i) a billing report, (ii) a resource usage report, or (iii) an audit report.

2. The system of claim 1, wherein the at least one processor is further configured to execute the computer-executable instructions to:
   normalize the tag set prior to determining the representative value.

3. The system of claim 1, wherein the stored information comprises a mapping between the tag set and the determined representative value.

4. The system of claim 1, wherein the request is associated with the use of at least one resource, and wherein the identified tag set comprises a tag set associated with the at least one resource.

5. A method, comprising:
   under control of one or more computer systems configured with executable instructions,
      receiving a request associated with one or more network resources, wherein the request includes a set of one or more tags, the set of one or more tags for tracking metrics associated with the request;
      identifying the set of one or more tags;
      determining a representative value for the set of one or more tags based at least in part on at least one hashing operation performed on the set of one or more tags;
      associating the representative value with the request;
      removing the association between the request and the set of one or more tags prior to the request being processed by at least one network server, wherein the set of one or more tags is not included within the request; and
      reconstructing, based at least in part upon the representative value, the set of one or more tags to facilitate generation of one or more reports, wherein the one or more reports comprise at least one of (i) a billing report, (ii) a resource usage report, or (iii) an audit report.

6. The method of claim 5, further comprising:
   normalizing the set of one or more tags prior to determining the representative value.

7. The method of claim 6, wherein normalizing the set of one or more tags comprises:
   ordering the one or more tags by at least one of (i) keys associated with the one or more tags or (ii) values associated with the one or more tags.

8. The method of claim 5, wherein receiving a request comprises receiving one of (i) a request associated with the allocation of the one or more network resources or (ii) a request associated with the use of the one or more network resources.

9. The method of claim 5, wherein determining a representative value comprises determining a representative value based at least in part upon performing a hashing operation on the set of one or more tags.

10. The method of claim 5, wherein determining a representative value comprises determining a representative value based at least in part upon executing a compression function on the set of one or more tags.

11. The method of claim 5, further comprising:
   storing information associated with the set of one or more tags and the determined representative value.

12. The method of claim 11, further comprising:
   identifying a customer associated with the received request,
   wherein storing information comprises storing information in association with the identified customer.

13. The method of claim 5, further comprising:
   routing the received request and the associated representative value to the network server for processing.

14. The method of claim 5, wherein identifying a set of one or more tags comprises identifying one or more tags included in the received request.

15. The method of claim 5, wherein identifying a set of one or more tags comprises:
   identifying at least one resource associated with the received request; and
   identifying one or more tags associated with the at least one resource.

16. The method of claim 5, further comprising:
   identifying a user associated with the received request; and
   identifying the set of one or more tags based at least in part upon the identity of the user.

17. The method of claim 5, further comprising:
   identifying at least one resource associated with the received request;
   identifying an entity on whose behalf the at least one resource was allocated; and
   identifying the set of one or more tags based at least in part upon the identity of the entity.

18. The method of claim 5, wherein reconstructing the set of one or more tags comprises:
   accessing, utilizing the representative value, stored information comprising correspondences between representative values and tag sets; and
   determining, based at least in part upon the accessed information, the set of one or more tags.

19. The method of claim 18, wherein reconstructing the set of one or more tags comprises:
   identifying a match between the representative value and a stored representative value; and
   identifying a stored tag set associated with the stored representative value as the set of one or more tags.

20. The method of claim 18, wherein reconstructing the set of one or more tags comprises:
   executing, utilizing the representative value, a combinatorial search of stored tag information; and
   determining the set of one or more tags based at least in part upon the combinatorial search.

21. The method of claim 18, further comprising:
   receiving, from a customer, at least a portion of the information comprising correspondences between representative values and tag sets; and
   storing the received information.

22. One or more non-transitory computer-readable media storing computer-executable instructions that, when executed by at least one processor, configure the at least one processor to:
   receive a request associated with one or more network resources;
   identify a set of one or more tags included with the request;
   determine, based upon at least one of a hashing operation or a compression function performed on the set of one or more tags, the representative value;
   process the request; and
   reconstruct, after the processing of the request and based at least in part upon the representative value, the set of one or more tags to facilitate generation of one or more reports, wherein the one or more reports comprise at least one of (i) a billing report, (ii) a resource usage report, or (iii) an audit report.

23. The computer-readable media of claim 22, wherein the computer-executable instructions further configure the at least one processor to:
   normalize the set of one or more tags prior to determining the representative value.

24. The computer-readable media of claim 22, wherein the representative value comprises a representative value included in the received request.

25. The computer-readable media of claim 22, wherein the computer-executable instructions further configure the at least one processor to:
   store information associated with the set of one or more tags and the representative value.

\* \* \* \* \*